July 19, 1949.   F. W. GRIESE   2,476,659
ANIMAL TRAP
Filed May 28, 1946   2 Sheets-Sheet 2
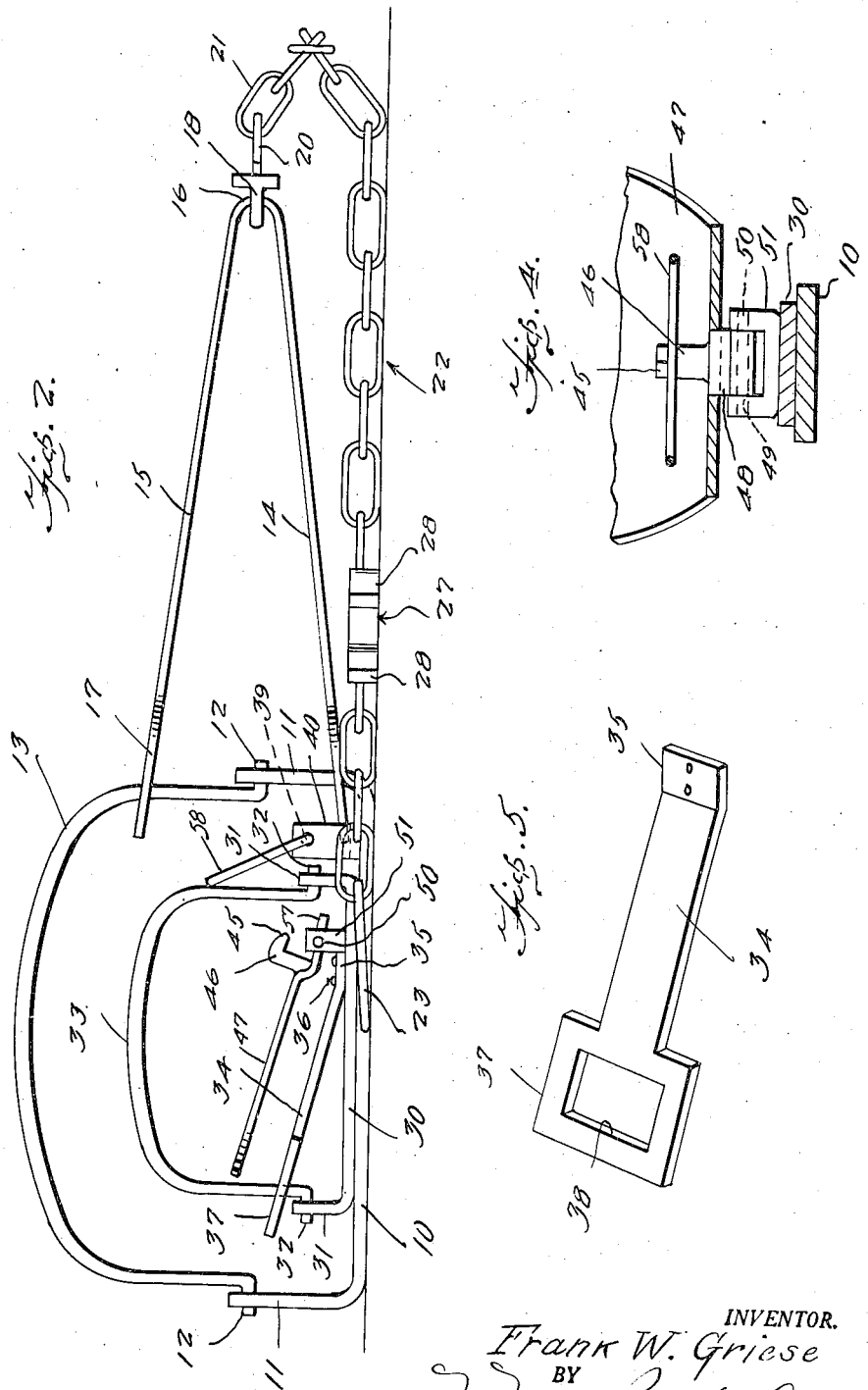
INVENTOR.
Frank W. Griese Patented July 19, 1949

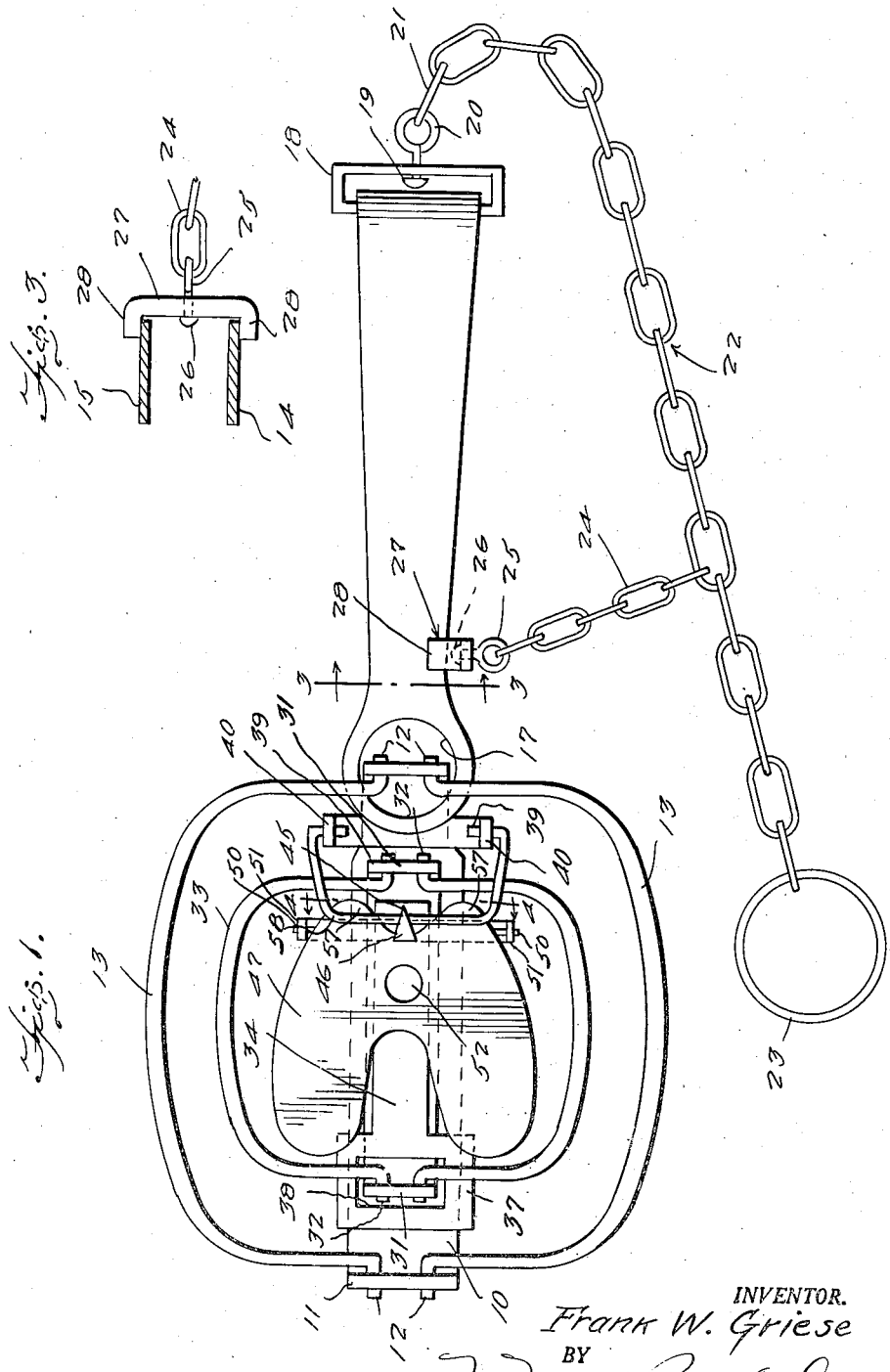

2,476,659

UNITED STATES PATENT OFFICE 2,476,659

ANIMAL TRAP

Frank W. Griese, Fond du Lac, Wis.

Application May 28, 1946, Serial No. 672,853

2 Claims. (Cl. 43—90)

This invention relates to an animal trap, and more particularly to such a trap of the double or multiple-jaw type.

A primary object of this invention is the provision of an improved animal trap characterized by a double set of jaws, one of which is adapted to be actuated by a trigger associated with a bait pan, for initially catching the animal, and the other of which is adapted to be actuated subsequent to the action of the first pair by any movement of the trap which may be occasioned by movement of the animal.

An additional object of this invention is the provision of an improved trap adapted to firmly secure the leg, or legs, of an animal captured thereby in such manner as to prevent the escape of the animal, such as might be effected by removal of a toe or the like.

A further object of the invention is the provision of such a trap which is sturdy and durable in construction, reliable and efficient in operation, which requires no more space than a single jaw trap, and which is inexpensive to manufacture and utilize.

Still other objects reside in the combinations of elements, arrangements of parts, and features of construction, all as will be more fully pointed out hereinafter, and shown in the accompanying drawings, wherein there is disclosed a preferred embodiment of this inventive concept.

In the drawings:

Figure 1 is a top plan view of one form of trap embodying this inventive concept shown in set position, certain concealed portions thereof being indicated by dotted lines.

Figure 2 is a side elevational view of the trap of Figure 1 shown in sprung position, both jaws being closed.

Figure 3 is a sectional view taken substantially along the line 3—3 of Figure 1, and viewed in the direction indicated by the arrows.

Figure 4 is a fragmentary sectional view taken substantially along the line 4—4 of Figure 1, as viewed in the direction indicated by the arrows.

Figure 5 is a perspective view of a constructional detail.

Similar reference characters refer to similar parts throughout the several views of the drawings.

Having reference now to the drawings, there is generally indicated at 10 a main base plate, from the opposite extremities of which lugs 11 extend upwardly. Each of the lugs 11 is provided with a pair of aligned apertures into which extend the extremities 12 of trap jaw members 13 of conventional configuration.

One leg 14 of a U-shaped spring steel member is secured in any desired manner to the base 10, while the other leg 15 thereof extends forwardly from the bend 16 and terminates in an apertured portion 17 forming a loop of greater diameter than the lug 11, and adapted to be positioned over the adjacent lug 11 below the extremities 12 of the jaws 13 when the trap is in set position.

An apertured link 18 is positioned about the bend 16 of the U-shaped spring, and has secured thereto, as by a rivet head 19, an eye 20, to which in turn is secured the end link 21 of a chain 22, provided at its opposite extremity with a ring 23 adapted for the encirclement of a stake or the like for securing the trap in position.

A supplemental chain 24 is suitably secured to an intermediate link of the chain 22, and terminates in an eye 25 secured, as by a rivet head 26, in a U-shaped clamping bracket 27 provided with inwardly turned flanges 28 adapted, when the jaws 13 are in open position and the spring leg 15 depressed, to retain the legs 14 and 15 in the position indicated in Figure 3.

Obviously, movement of the trap, as effected in a manner to be hereinafter more fully described, will dislodge the spring legs 14 and 15 from the U-shaped clamp 27, whereupon the resiliency of the material will cause an upward movement of the spring leg 15 to the position shown in Figure 2, thus closing the jaws 13 and securely holding the same in closed position.

Referring back now to the base 10, the same is provided on its upper face with a supplemental base 30, of shorter length than the base 10, and provided at its opposite extremities with apertured upstanding lugs 31. The apertures in each of the lugs 31 are adapted to accommodate the extremities 32 of inner jaws 33 similar in configuration to the jaws 13, but of lesser size.

A spring steel member 34, having an angularly disposed end piece 35, is suitably secured, as by rivets 36, to the base member 30. The member 34 at its outer extremity terminates in an enlarged head portion 37 having a central aperture 38 therein of a dimension, when the trap is in set position, to surround the associated lug 31 below the end portions 32 of the jaws 33. The member 34 is adapted to be held in compressed position by the jaws 33 when the same are rotated to flat position or open position, as disclosed in Figure 1, the jaws being retained in such position by means of a loop member 58, adapted to overlie the end portions of the jaw and terminating in inwardly extending projections 39 engaging in suitable apertures in lugs 40 upstanding from a transverse plate 41 mounted on the base 10.

The loop 58 is adapted to be held in flat position by the extremity 45 of a trigger member 46 comprising an upstruck portion of a trip pan 47. The pan 47 is provided with a depending lug 48 having a bore 49 therein adapted to accommodate a pin 50, the ends of which are seated in suitable bores in lugs 51 extending upwardly from the plate 30.

As best shown in Figure 1, the pan 47 may be provided with an aperture 52, in which bait may be positioned, or the bait may be secured directly to the trigger member 46, if desired.

At both sides of trigger 46, trip pan 47 has a pair of extensions 57, 57 upon which loop member 58 may overlie, the loop member 58 being pivotally mounted on the transversely spaced lugs 40 in a position to be swingable on an axis transverse to the base 10 inwardly upon the trap jaws 33 in open condition thereof in order to engage the latching extremity 45 of the trigger 46 and simultaneously overlie the integral extensions 57, 57, of the trip pan 47.

From the foregoing the operation of the device should now be readily understandable. When both sets of jaws are set in the position shown in Figure 1, the jaws 33 being held in position by the loop 58, and the trigger 46, and the jaws 13 being held in position by the member 27, as previously described, it will be apparent that an animal, attracted by the bait, stepping upon the pan 47 will release the trigger 45 from its engagement with the loop 58, whereupon spring member 34 will force the jaws 33 into closed position. Obviously, when the animal feels its foot caught in the trap, even though caught only by a toe or toenail, and seeks to pull itself free, any resultant movement of the trap will disengage the legs 14 and 15 from their clamping member 27, whereupon the leg 15 will move to the position shown in Figure 2, effectively closing the jaws 13, thus doubly securing the animal and precluding its escape by virtue of the double grip on the leg of the animal.

From the foregoing it will now be seen that there is herein provided an improved animal trap which accomplishes all the objects of this invention.

As various embodiments may be made of this inventive concept, and as many modifications may be made in the embodiment hereinbefore shown and described, it is to be understood that all matter herein is to be interpreted merely as illustrative and not in a limiting sense.

I claim:

1. In an animal trap comprising an elongated base, a pair of lugs spaced apart upon the latter, a pair of trap jaws pivotally mounted on the lugs, the combination of a trap spring having one end thereof rigidly supported on the base inwardly of one lug and terminating at the other end in a looped portion engaging about the other lug in open position of the jaws, a pair of further lugs fixed on said base inwardly of the first mentioned one lug, a trip pan pivotally mounted upon the further lugs to pivot on an axis transverse to said base, a trigger fixed on the trip pan having a latching extremity extending above the further lugs in the direction of said one lug, a pair of transversely spaced lugs rigidly supported upon said base outwardly beyond the last mentioned one lug, a pair of integral extensions on said trip pan at both sides of said trigger, and a swingable loop member pivotally mounted on said transversely spaced lugs in a position to be swingable on an axis transverse to said base inwardly upon the trap jaws in open condition thereof in order to engage with the latching extremity of the trigger and simultaneously overlie the integral extensions on said trigger pan.

2. In an animal trap comprising an elongated base, end lugs upon the latter, and a pair of outer jaws pivotally mounted in the end lugs, the combination of a U-shaped spring member having loop portions upon the free ends thereof engaging one end lug upon the base in open position of the jaws with one of said loop portions engaging about the adjacently pivoted ends of said jaws in closed position of the latter, a chain attached to the bight of said U-shaped spring member for attaching the trap as a whole to a stationary object, a U-shaped bracket adapted to grip the sides of said U-shaped spring member independently of said base, a branch upon said chain inter-connecting an intermediate portion thereof with said U-shaped bracket for releasing said bracket from said U-shaped spring member when tension is applied to said chain in such fashion as to withdraw said bracket from said U-shaped spring member, a pair of further lugs rigidly supported on said base and spaced inwardly of said end lugs, a pair of further jaws pivotally mounted upon the further lugs, a trap spring having one end rigidly supported on said base inwardly of the one further lug which is adjacent to said one end lug and terminating at the other end in a loop portion engaging about the other or second further lug in open position of the further jaws, additional lug means fixed on said base adjacent to the first mentioned one end of the trap spring inwardly of said one further lug, a trip pan pivotally mounted upon the additional lug means upon an axis transverse to said base, a trigger fixed on the trip pan having a latching extremity extending above the additional lug means in the direction of said one further lug, a pair of transversely spaced lugs disposed upon said base substantially between said one end lug and said one further lug, a pair of integral extensions on said trip pan at both sides of said trigger, and a swingable loop member pivotally mounted on said transversely spaced lugs in a position to be swingable on an axis transverse to said base inwardly upon the further jaws in open condition thereof in order to engage with the latching extremity of the trigger and simultaneously overlie the integral extensions on said trip pan.

FRANK W. GRIESE.

REFERENCES CITED

The following references are of record in the file of this patent:

UNITED STATES PATENTS

| Number | Name | Date |
|---|---|---|
| 180,558 | Davis | Aug. 1, 1876 |
| 524,415 | Collins | Aug. 14, 1894 |
| 1,186,569 | Gibbs | June 13, 1916 |
| 1,458,286 | Gibbs | June 12, 1923 |
| 1,540,590 | Allen | June 2, 1925 |
| 1,545,018 | Smith | July 7, 1925 |
| 1,572,384 | Dufrene | Feb. 9, 1926 |
| 1,594,939 | Gibbs | Aug. 3, 1926 |